United States Patent [19]

Imajyo et al.

[11] Patent Number: 4,973,103

[45] Date of Patent: Nov. 27, 1990

[54] VEHICLE REAR BODY STRUCTURE

[75] Inventors: Hideyuki Imajyo, Higashi; Hirokazu Ishikawa, Hiroshima, both of Japan

[73] Assignee: Mazda Motor Corporation, Hiroshima, Japan

[21] Appl. No.: 282,323

[22] Filed: Dec. 9, 1988

[30] Foreign Application Priority Data

Dec. 11, 1987 [JP] Japan .................................. 62-314389
Jan. 12, 1988 [JP] Japan .................................. 63-6284[U]

[51] Int. Cl.$^5$ ............................................. B62D 25/08
[52] U.S. Cl. ....................................... 296/195; 296/30; 296/185; 296/191; 296/198; 296/201; 296/203
[58] Field of Search ............... 296/203, 195, 187, 198, 296/201, 193, 191, 29, 30, 185

[56] References Cited

U.S. PATENT DOCUMENTS

| | | | |
|---|---|---|---|
| 1,801,137 | 4/1931 | Brun | 296/203 |
| 1,828,743 | 10/1931 | Lovell | 296/203 |
| 2,925,050 | 2/1960 | Candlin, Jr. et al. | 296/191 X |
| 4,234,225 | 11/1980 | Harasaki et al. | 296/185 |
| 4,252,364 | 2/1981 | Toyama et al. | 296/185 |
| 4,304,434 | 12/1981 | Suzuki et al. | 296/195 |
| 4,717,197 | 1/1988 | Harasaki | 296/195 |
| 4,875,733 | 10/1989 | Chado et al. | 296/195 |

FOREIGN PATENT DOCUMENTS

| | | | |
|---|---|---|---|
| 57-14140 | 3/1982 | Japan . | |
| 57-97770 | 6/1982 | Japan . | |
| 131377 | 7/1985 | Japan | 296/195 |
| 226369 | 10/1986 | Japan | 296/195 |
| 247577 | 11/1986 | Japan | 296/195 |
| 63-119178 | 8/1988 | Japan . | |

OTHER PUBLICATIONS

"Autobody", Jul. 1928, pp. 13-14.

Primary Examiner—Margaret A. Focarino
Assistant Examiner—Andrew C. Pike
Attorney, Agent, or Firm—Fleit, Jacobson, Cohn, Price, Holman & Stern

[57] ABSTRACT

A rear body structure of an automotive vehicle includes a roof side rail disposed at an upper end of the body structure and extends longitudinally in a vehicle body. A belt line reinforcement is located downward of and extending substantially parallel with the roof side rail. A center pillar structure extends in up and down directions and is attached to the roof side rail at an upper end and to the belt line reinforcement intermediate of the upper end and a lower end of the center pillar structure. A rear pillar structure extending in the up and down directions is located rearward of the center pillar structure and attached to the roof side rail at an upper end and to the belt line reinforcement intermediate of the upper end and to a lower end of the rear pillar structure. A quarter pillar member extending in the up and down directions is located between the center pillar and the rear pillar and attached to the roof side rail at an upper end and to the belt line reinforcement intermediate of the upper end and a lower end of the quarter pillar member. A quarter pillar reinforcement is mounted on the quarter pillar member and is attached to the roof side rail at an upper end of the quarter pillar reinforcement and to the belt line reinforcement at a lower end of the quarter pillar reinforcement.

11 Claims, 8 Drawing Sheets

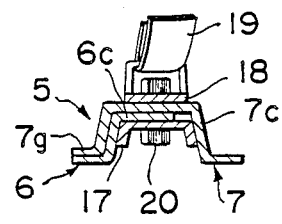
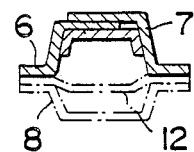
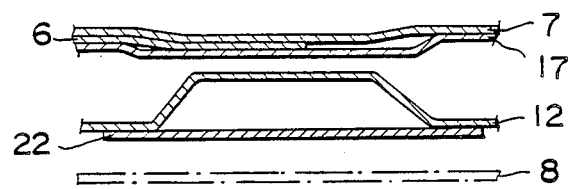
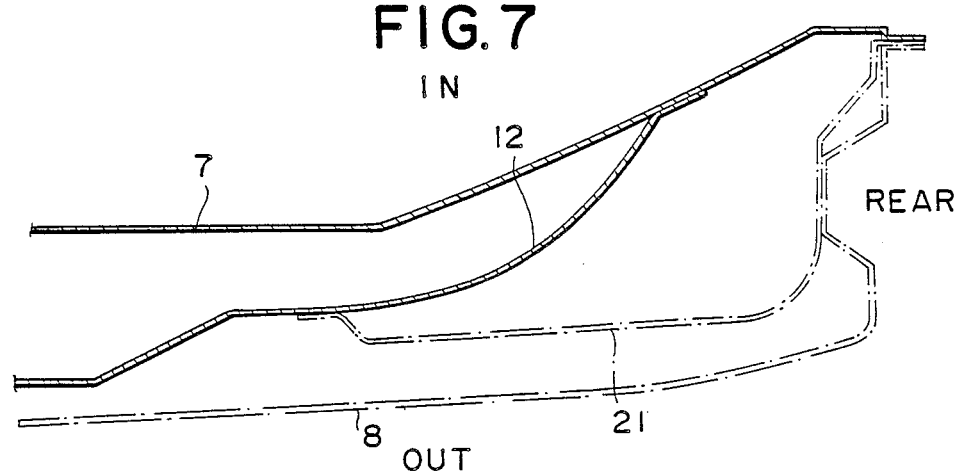

VEHICLE REAR BODY STRUCTURE

BACKGROUND OF THE INVENTION

1. Field of the invention

The present invention relates to a rear body structure of an automotive vehicle, particularly to an improvement of a rear side body in the vicinity of rear wheels of the vehicle.

2. Description of the prior art

There has been proposed a vehicle body structure having an improved bending rigidity against a load transmitted thereto through the rear wheels of the vehicle. Japanese Utility Model Public Disclosure No. 57-97770 laid open to the public in 1982 discloses a vehicle body structure comprising a pillar reinforcement arranged in a rear pillar member of a vehicle body and connected with a roof side rail at an upper end thereof and with a reinforcement of a floor panel at a lower end.

U.S Pat. No. 4,234,225 discloses a rear reinforcement structure having a longitudinal reinforcement member in a side panel structure to be connected with a rear pillar of the vehicle body for providing a door edge seat portions with a sufficient strength and adequate rigidity.

Japanese Utility Model Public Disclosure No. 63-119178 laid open to the public on Aug. 2, 1988 discloses a quarter panel structure reinforced by a longitudinal reinforcement disposed in a space formed by a roof side inner panel and a quarter outer panel. In the vehicle rear body structure, a rear pillar extends upwardly and forwardly so that the rear pillar is connected with a rear fender panel at a lower end portion thereof in a manner of making an acute angle with the rear fender panel. This structure is disadvantageous in that a stress tends to concentrate to the joint portion of the rear pillar and the rear fender panel.

Japanese Utility Model Publication No. 57-14140 published on Mar. 23, 1982 discloses a body structure in which a side panel member is constituted by a front side outer panel and a rear side outer panel. In this structure, the front side outer panel is formed with a recess portion at a rear end portion and a rear side outer panel is formed with a recess portion at the front end portion wherein the recess portions of the front and rear side outer panels are complimentary to each other and expanding in opposite directions. The rear end of the front side panel is connected with the front end of the rear side panels to form a center pillar portion of closed cross section.

In manufacturing a vehicle body structure, where a panel member is divided to small pieces of members as disclosed in the Japanese Utility Model publication No. 57-14140, the body structure can be easily manufactured.

It should however be noted that the structure disclosed in the Japanese Utility Model publication No. 57-14140 is still disadvantageous in the following points. Namely, the side panels have the recesses for forming the center pillar portion of closed cross section. These recesses make a machine such as molding configuration complicated. This means that a manufacturing process becomes complicated resulting in a limitation of a variation in designing the body structure.

SUMMARY OF THE INVENTION

It is therefore an object of the present invention to provide a vehicle rear body structure having a sufficient strength against a force applied thereto.

It is another object of the present invention to provide a vehicle rear body structure which can disperse a force applied thereto in the body structure so as to ease a concentration of a stress in components constituting the body structure.

It is still another object to provide a vehicle rear body structure which can be easily manufactured.

It is a further object of the present invention to provide a vehicle rear body structure which can provide a broad variation in designing the body structure.

The above and other objects of the invention can be accomplished by a rear body structure of an automotive vehicle comprising roof side rail means disposed at an upper portion of the body structure and extending longitudinally in a vehicle body of the vehicle, belt line reinforcement means located downward of and substantially parallel with said roof side rail means, center pillar means connected with the roof side rail means at an upper end portion and with the belt line reinforcement at a lower end portion, rear pillar means located rearward of the center pillar means and connected with the roof side rail means at an upper end portion and with the belt line reinforcement means at a lower end portion, quarter pillar means located between the center pillar means and the rear pillar means and connected with the roof side rail means at an upper end portion and with the belt line reinforcement means at a lower end portion, pillar reinforcement means provided in the quarter pillar means and connected with the roof side rail means at an upper means and with the belt line reinforcement means, wheel housing means for covering a vehicle wheel, and suspension reinforcement means connected with the belt line reinforcement means at one end portion and with the wheel housing means at the other end portion.

The suspension reinforcement means is aligned with the quarter pillar means in an up and down direction of the vehicle.

The center pillar means, quarter pillar means and the rear pillar means can be constituted by combining outer panel means and inner panel means to form pillar portions of closed cross sections corresponding to the respective pillar means.

For this purpose, the panel means should be formed with recess or groove portions for providing the pillar portions.

In a preferred embodiment, the panel means are divided into a plurality of panel elements so as to enable to utilize a relatively small size press in manufacturing the panel elements so that a manufacturing cost can be reduced. In this case, the panel means are divided at the recess or groove portions for forming the pillar portions. Namely, dividing lines by which the panel means are divided into small panel elements are formed in the recess or groove portions and extend in a direction in which the recess or groove portions extend. As a result, each of the panel elements for constituting the panel means is formed with a peripheral bent portion for forming the pillar portions. Generally, a recess located at a middle portion of a panel element tends to make a manufacturing process difficult and to limit variations in designing the panel element with regard to depth, size, and configuration of the recess. In this regard, each of the panel elements in accordance with the present invention is constituted to include such recesses as small as possible to be simplified in configuration to thereby accomplish easy manufacture resulting in a reduction of a manufacturing cost. In addition, it is advantageous in that such small panel elements would be commonly used for another model of a vehicle body in many cases.

A rear body structure of an automotive vehicle according to the invention includes a vehicle body, a roof side rail disposed at an upper end of the vehicle body and extending longitudinally in the vehicle body, a belt line reinforcement located downward of and extending substantially parallel with said roof side rail, a center pillar structure extending in up and down directions and attached to the roof side rail at an upper end of the center pillar structure and to the belt line reinforcement intermediate of the upper end of the center pillar structure and a lower end of the center pillar structure, a rear pillar structure extending in the up and down directions, located rearward of the center pillar structure, and attached to the roof side rail at an upper end and to the belt line reinforcement intermediate of the upper end of the rear pillar structure and a lower end of the rear pillar structure, a quarter pillar member extending in the up and down directions, located between the center pillar structure and the rear pillar structure, and attached to the roof side rail at an upper end of the quarter pillar member and to the belt line reinforcement intermediate of the upper end of the quarter pillar member and a lower end of the quarter pillar member, a quarter pillar reinforcement mounted on the quarter pillar member and attached to the roof side rail at an upper end of the quarter pillar reinforcement and to the belt line reinforcement at a lower end of the quarter pillar reinforcement, a wheel housing for covering a vehicle wheel, and a suspension reinforcement extending in the up and down directions, disposed in an overlapped relationship with the quarter pillar member and the quarter pillar reinforcement, and integrally joined with the quarter pillar reinforcement and the quarter pillar member at an upper end portion of the suspension reinforcement and wit the wheel housing at a lower end of the suspension reinforcement, a center pillar reinforcement mounted on the center pillar, said belt line reinforcement being connected with the center pillar reinforcement at a front end portion of the center pillar reinforcement, and a rear pillar reinforcement mounted on the rear pillar structure, said belt line reinforcement being attached to the rear pillar reinforcement at a rear end of the rear pillar reinforcement.

Additionally, the quarter pillar reinforcement is aligned with the suspension reinforcement with regard to the up and down directions, or inner panel means form an inner panel structure of the rear body structure, outer panel means form an outer side panel structure of the rear body structure, the inner panel means being connected with the outer panel means to form the center pillar structure, the quarter pillar member and the rear pillar structure, and the inner panel means comprises a front inner panel and a rear inner panel, the front inner panel being connected with the rear inner panel at a position where the quarter pillar member is located, and the front inner panel is connected with a front portion of the rear inner panel at a rear end in an overlapped relationship with each other to form a single recess by incorporation together. Alternately, said quarter pillar reinforcement is fixed to the inner panel means at said position, and a seat belt anchor is secured to said quarter pillar reinforcement.

Further, the rear inner panel is provided with an extension extending forwardly across the quarter pillar member. Said suspension reinforcement extends upwardly across said belt line reinforcement and is terminated in said quarter pillar member. Said suspension reinforcement is provided with an upper extension which extends upwardly beyond said belt line reinforcement and is terminated in said quarter pillar member, the suspension reinforcement being connected with the belt line reinforcement, and the upper extension being connected with the quarter pillar member. The suspension reinforcement is connected with the inner panel means to form a closed cross-sectioned structure.

In assembling process, the panel elements are combined to form a body structure including the pillar portions.

The above and other features of the present invention will be apparent from the following description taking reference with the accompanying drawings.

BRIEF DESCRIPTION OF THE DRAWINGS

FIG. 5 is a sectional view taken along a line 5-5 in FIG. 2;

FIG. 6 is a sectional view taken along a line 6-6 in FIG. 2;

FIG. 7 is a sectional view taken along a line 7-7 in FIG. 2;

FIG. 8 is a sectional view taken along a line 8-8 in FIG. 2;

DESCRIPTION OF THE PREFERRED EMBODIMENTS

Figure 1:
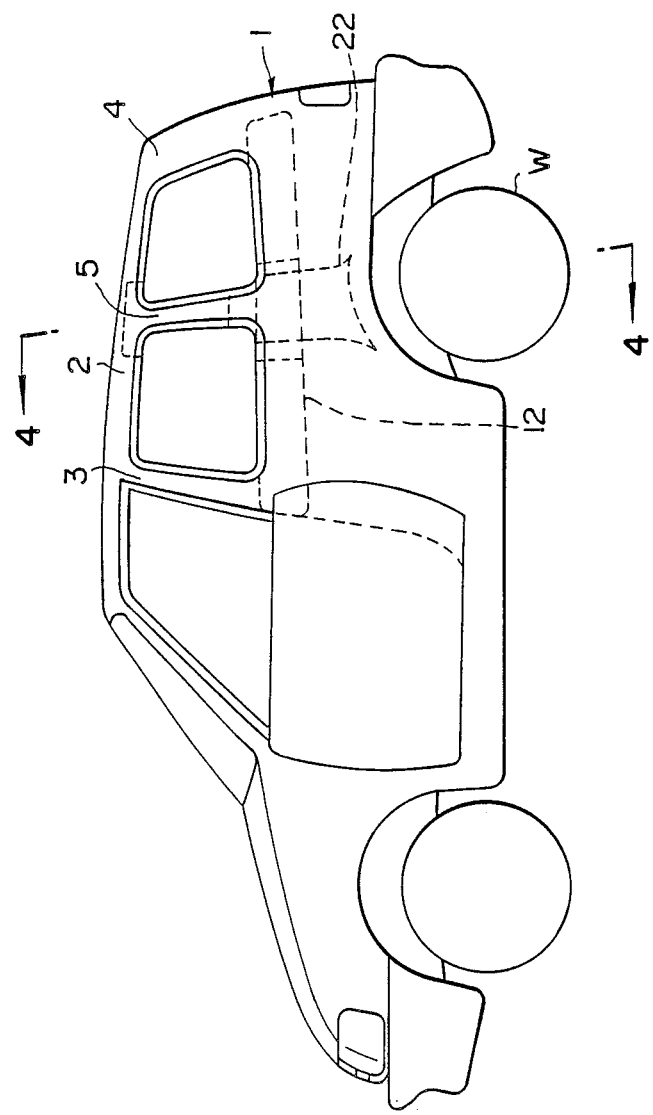
FIG. 1 is a schematic view of an automotive vehicle to which the present invention can be applied.

Now referring to the drawings, there is shown in FIG. 1 a schematic entire view of an automotive vehicle to which the present invention can be applied. Hereinafter, a description will be made with regard to one side of the vehicle. A vehicle body of the vehicle is provided with a rear side body structure 1 arranged at a rear side portion of the vehicle body for covering a rear wheel W and a roof side rail 2 disposed at an upper and side portion of the body and extending longitudinally. The vehicle body is further provided with a center pillar 3 extending downwardly from the roof side rail 2 at a middle portion of the roof side rail 2 and a rear pillar 4 arranged at a rear end portion and extending downwardly from the roof side rail 2. There is provided a quarter pillar 5 between the center pillar 3 and the rear pillar 4 extending downwardly from the roof side rail 2. The center pillar 3, rear pillar 4 and quarter pillar 5 constitute a part of the rear side body structure 1.

Hereinafter, there is described a panel structure for constituting the above vehicle body.

Figure 2:
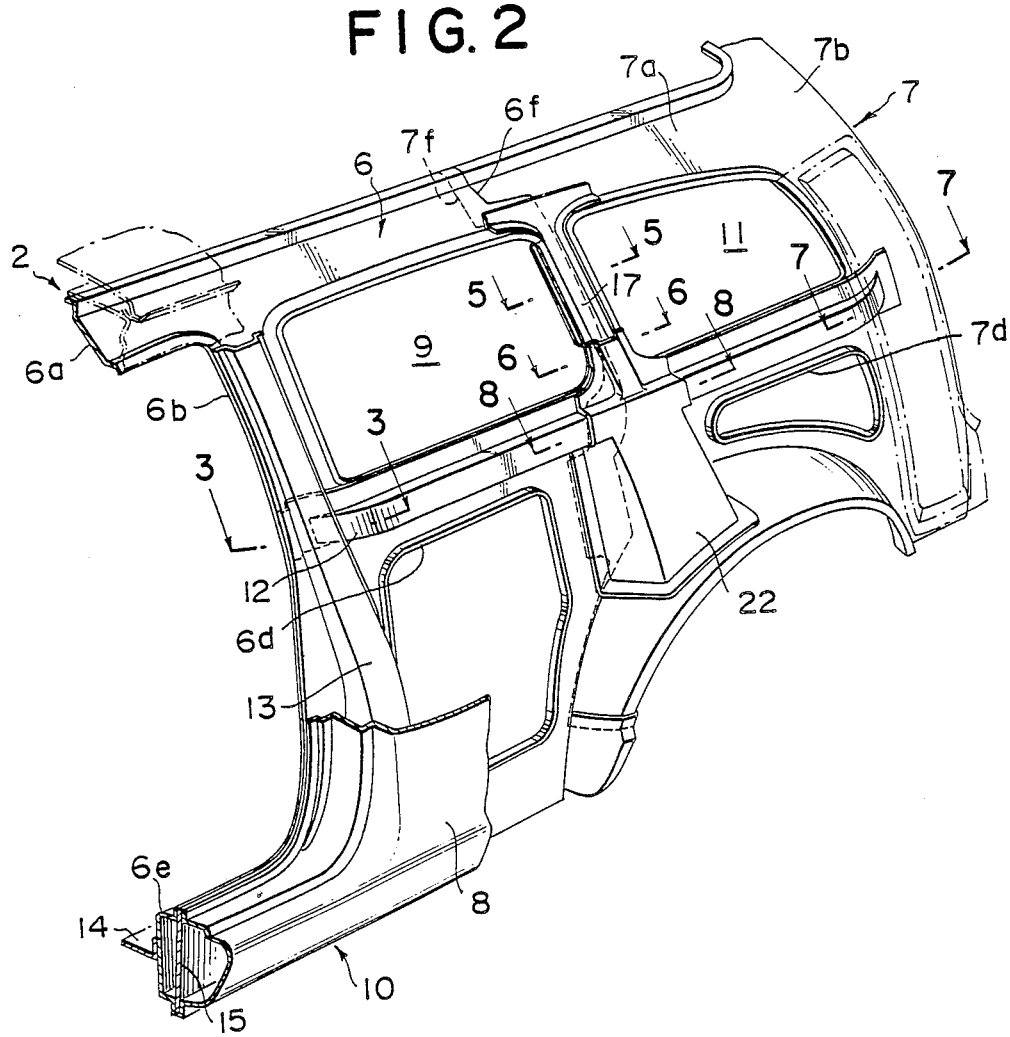
FIG. 2 is a perspective view which is partly broken to show a rear body structure of the vehicle of the FIG. 1.

Referring to FIG. 2, the rear side body structure 1 is provided with a front inner panel 6 and a rear inner panel 7 for constituting an inner side panel structure of the rear body structure 1 and an outer panel 8 for constituting an outer side panel structure of the rear side body structure 1. The front inner panel 6 is formed with a window opening 9. The front inner panel 6 is also provided with a roof side rail inner panel portion 6a for forming a part of an inner side panel structure of the roof side rail 2 at an upper end, a center pillar inner panel portion 6b for forming an inner side of the center pillar 3, a quarter pillar inner panel portion 6c for forming a part of an inner side of the quarter pillar 5 at a rear end, a belt line inner panel portion 6d for forming a part of a belt line frame portion of the rear body structure extending longitudinally in the vicinity of a lower end portion of the pillars 3, 4 and 5, and a side sill inner panel portion 6e for forming a part of an inner side of a side sill 10.

On the other hand, the rear inner panel 7 is formed with an window opening 11 as well as the front inner panel 6. The rear inner panel 7 is also provided with a roof side rail inner panel portion 7a for forming a rear part of an inner side panel structure of the roof side rail 2 at an upper end, a rear pillar inner panel portion 7b for forming an inner side of the rear pillar 4 at a rear end portion, a quarter pillar inner panel portion 7c for forming a part of an inner side of the quarter pillar 5 at a front end portion, a belt line inner panel portion 7d for forming a part of the belt line frame portion.

The roof side rail 2 is constituted by the inner panels 6 and 7 and the outer panel 8 to form a closed cross-sectioned structure at the upper end portion of the side body structure.

A belt line reinforcement 12 is arranged in a space formed between the inner panels 6 and 7 and the outer panel 8 and fixed to the inner panels so as to extend longitudinally to thereby constitute a part of the belt line frame.

Figure 3:
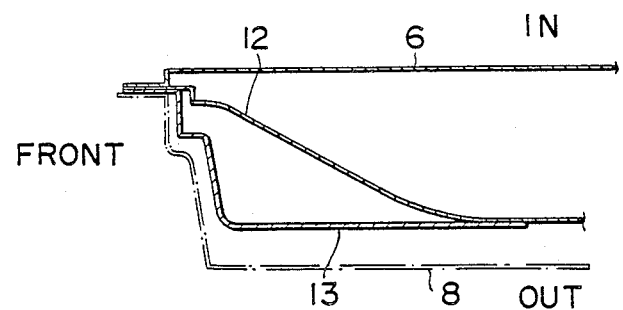
FIG. 3 is a sectional view taken along a line 3-3 in FIG. 2.

As shown in FIG. 2 and 3, a center pillar reinforcement 13 is disposed in a space between the front inner panel 6 and outer panel 8 for reinforcing the center pillar 3. The center pillar reinforcement 13 is fixed to the inner panel 6 and outer panel 8 and extends in the center pillar 3.

To the side sill inner panel portion 6e of the inner panel 6 is connected a floor panel 14. The side sill 10 is constituted by the side sill inner panel portion 6e and the outer panel 8 to form a closed cross section structure. A reinforcement 15 is arranged in a space defined by the closed cross section structure of the side sill 10 and joined to the panel portion 6e and the panel 8. The floor panel 14 is connected with a suspension system (not shown) including a spring 23 for absorbing a shock.

Referring to FIG. 4 in addition to FIGS. 2 and 3, the rear inner panel 7 is formed with a wheel house outer portion 7e at a lower end portion. The wheel house outer portion 7e is connected to a wheel house inner panel 16 to form a wheel housing for covering the rear wheel W. A rear end portion 6f of the front inner panel 6 is connected with a front end portion 7f of the rear inner panel 7 in a slightly overlapped relationship with each other. The quarter pillar 5 is formed to be located at the overlapped portion or joint portion of the front and rear inner panels 6, 7.

Figure 4A:
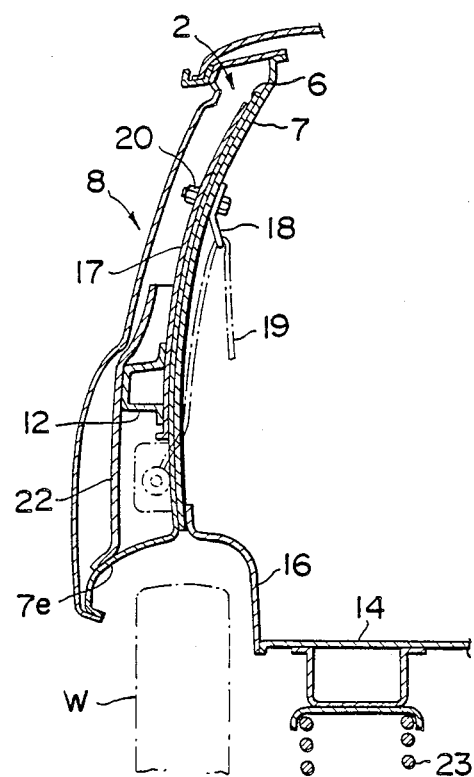
FIG. 4 (a) is a sectional view taken along a line 4-4 in FIG. 1.
FIG. 4(b) is a perspective view showing a connecting portion of inner panels.
Figure 4B:
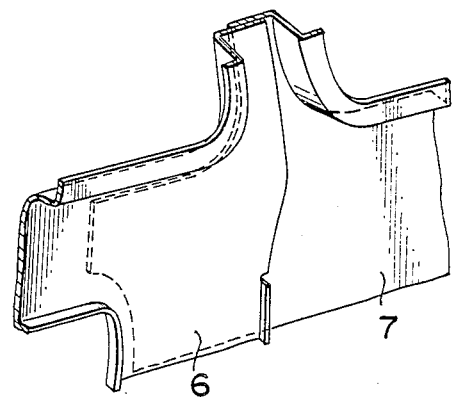
Figure 9:
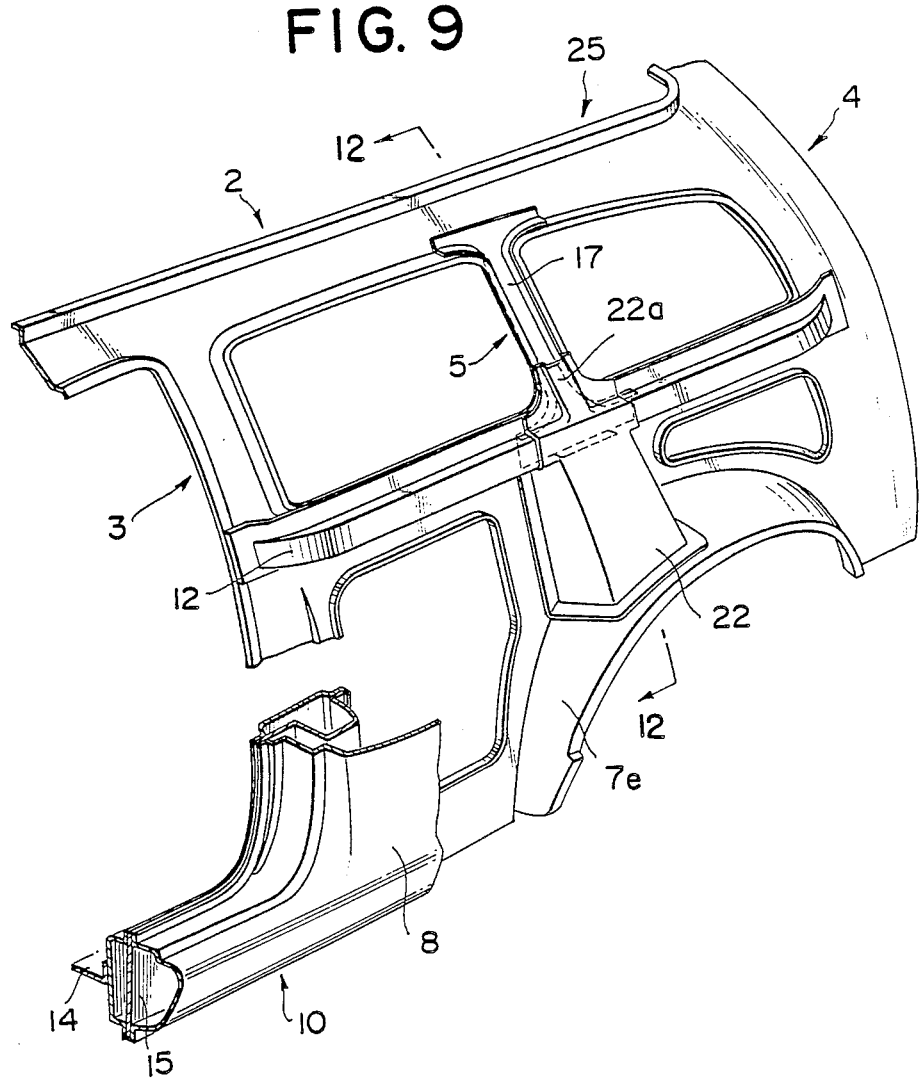
FIG. 9 is a perspective view similar to FIG. 2 but showing another embodiment of the present invention.

As shown in FIGS. 4(a), 4(b) and 5, a quarter pillar reinforcement 17 is fixed to the overlapped portion of the panels 6 and 7. A seat belt anchor 18 for hanging a seat belt 19 is mounted on an upper portion of the quarter pillar 5 through a bolt and nut member 20. The rear inner panel 7 is formed with an extension 7g which extends forwardly over the quarter pillar 5 and is terminated in a front end of a closed cross-sectioned structure defined by the quarter pillar 5 as shown in FIG. 5. The front end portion 7f of the rear inner panel 7 is terminated at least a half way of the quarter pillar 5 at a portion other than the extension 7g as shown in FIG. 6. This structure is advantageous in that there is no need to form a deep recess in manufacturing the inner panel 7 to facilitate press molding.

Referring to FIG. 7 in addition to FIG. 2, there is provided a rear pillar reinforcement 21 in a space constituted by the rear inner panel 7 and the outer panel 8 for forming the rear pillar 4. The rear reinforcement 21 is fixed to the belt line reinforcement 12 at a front end portion and to the inner panel 7 and outer panel at a rear end portion.

A suspension reinforcement 22 is arranged at a lower portion of the quarter pillar 5 and connected with the belt line reinforcement 12 at an upper end portion and with an upper surface of the wheel outer portion 7e of the inner panel 7. As shown in FIG. 2, the suspension reinforcement 22 is incorporated into the rear body structure in a manner that the suspension reinforcement forms a closed space together with the belt line reinforcement 12, inner panels 6 and 7 between the belt line frame and the wheel housing. The suspension reinforcement 22 is merged into the belt line frame at an upper portion and fixed to the belt line reinforcement as shown in FIG. 8.

With this structure, when a force is transmitted from the wheel housing to the rear body structure, the force can be dispersed to many components such as the center pillar 3, quarter pillar 5, rear pillar 4 through the suspension reinforcement 22 and the belt line frame. Namely, it is effected to improve the strength of the rear body structure of the vehicle by the present invention. Further, the front and rear inner panels 6 and 7 are connected with each other at the portion of the quarter pillar 5 in an overlapped relationship. This structure is effected to reinforce the quarter pillar 5 without providing any further reinforcement.

Now referring to FIGS. 9 through 13, there is shown another embodiment of the invention.

With this embodiment, the same components as the former embodiment are referred as the same numerals and detailed explanation thereto will be omitted.

Figure 10:
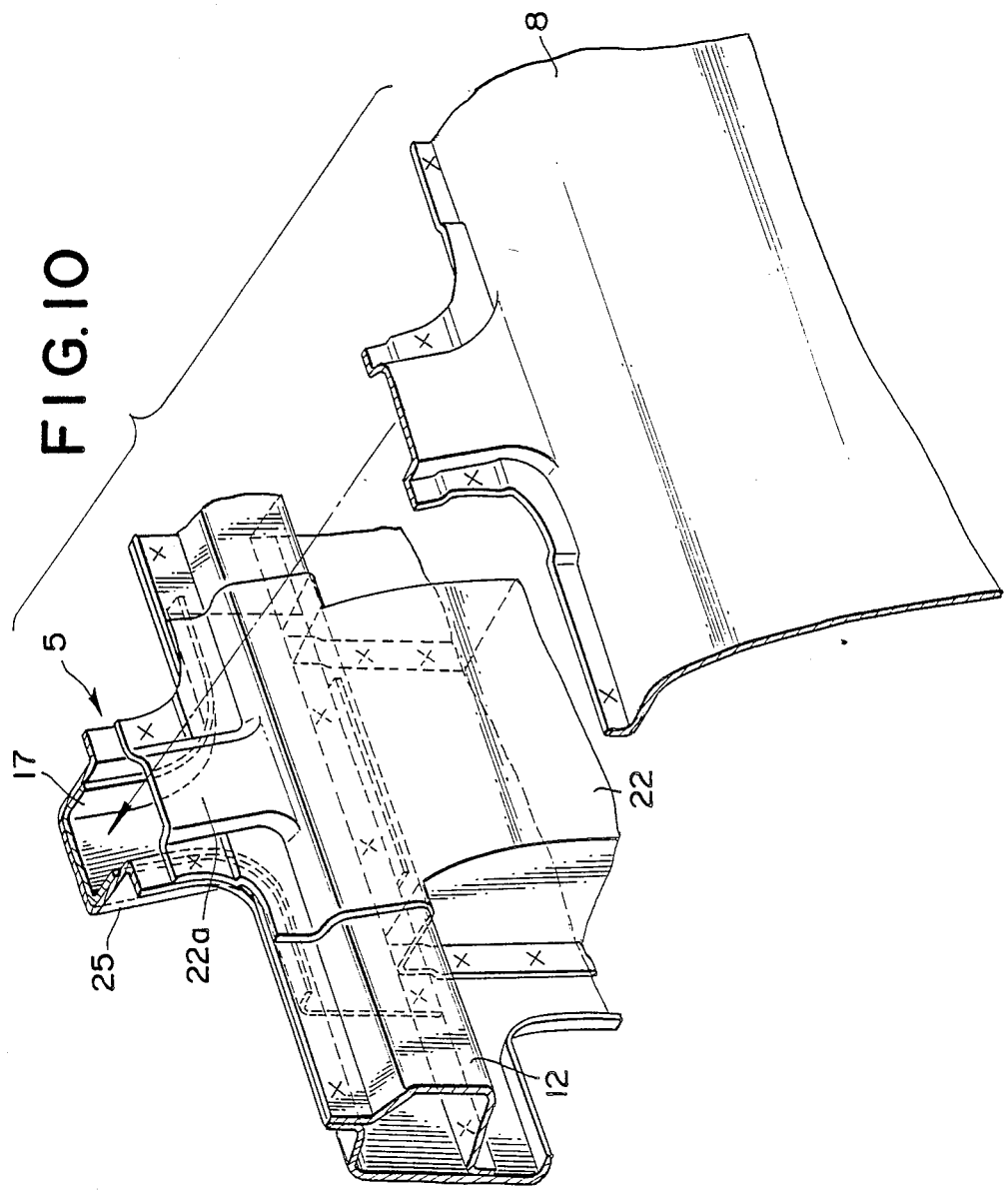
FIG. 10 is a perspective view showing a body structure around a suspension reinforcement in the embodiment of FIG. 9.
Figure 11:
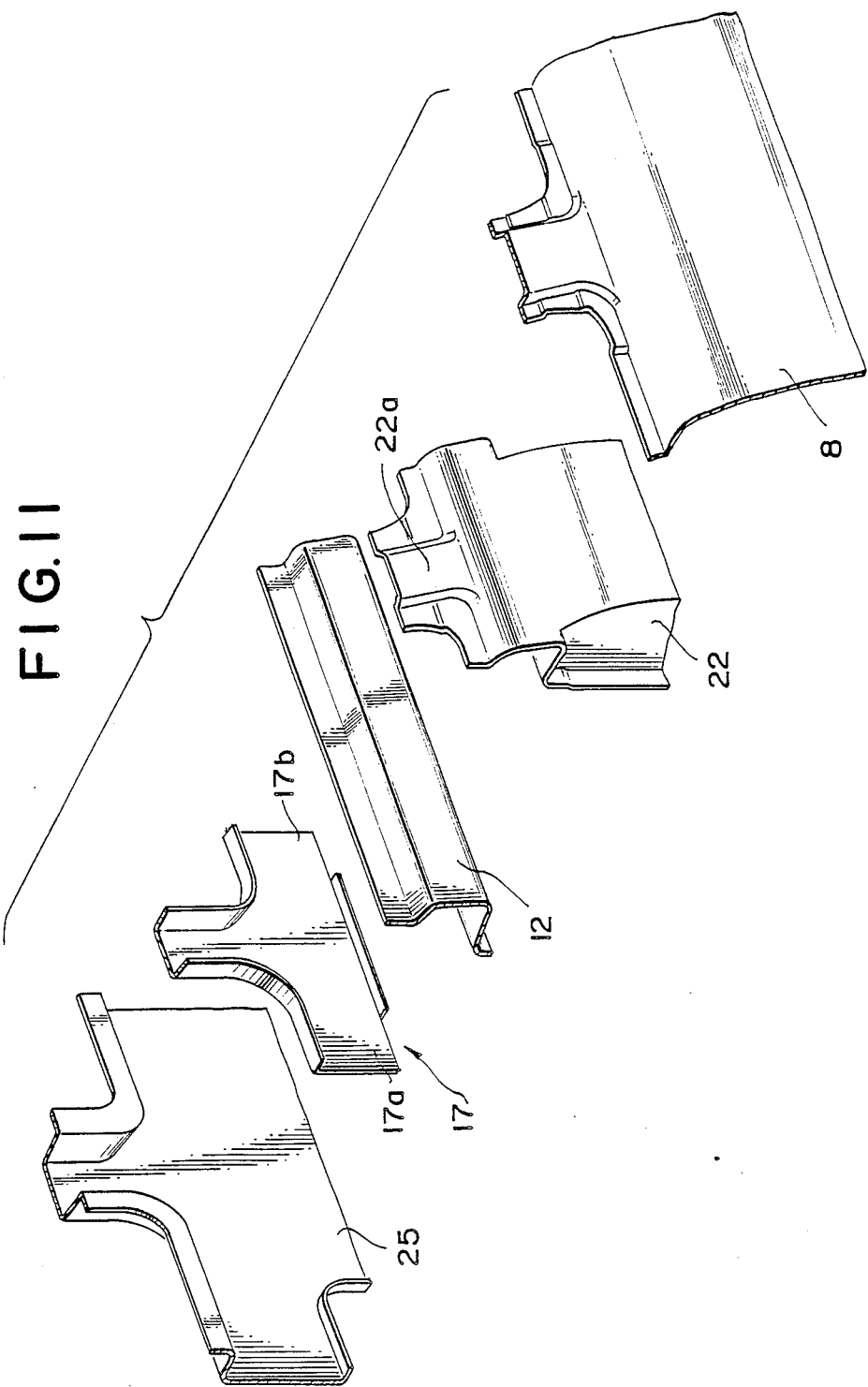
FIG. 11 is an explosive view showing the body structure shown in FIG. 10.
Figure 12:
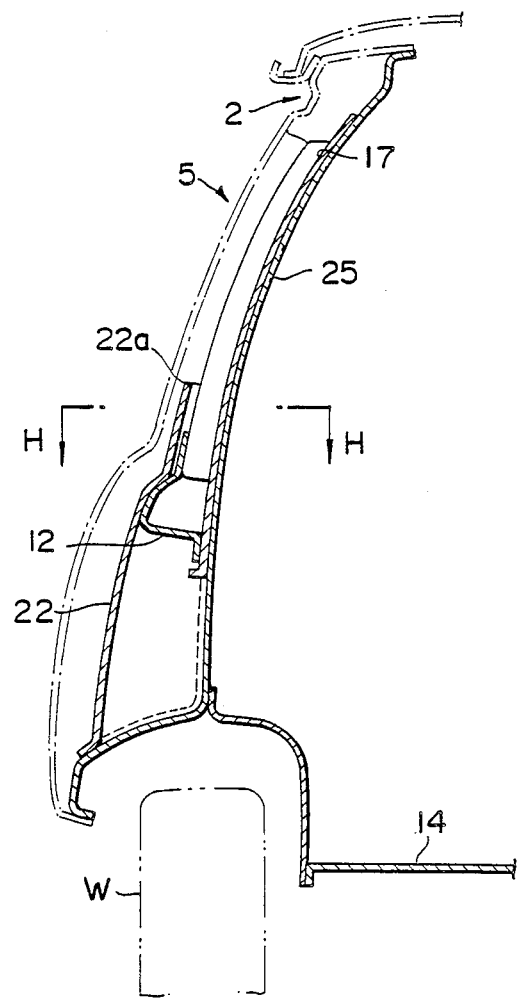
FIG. 12 is a sectional view taken along a line 12-12 in FIG. 9.
Figure 13:
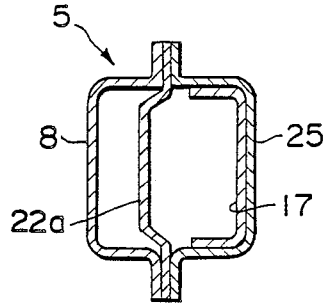
FIG. 13 is a sectional view taken along a line 13-13 in FIG. 12.

In this embodiment, a single piece inner panel 25 is employed in lieu of the front and rear inner panels 6 and 7 in the former embodiment. As shown in FIGS. 10 and 11, the suspension reinforcement 22 is formed with an upper extension 22a which extends across the belt line reinforcement 12 to be fixed to the inner panel 25 and outer panel 8 at the both ends as shown in FIGS. 12, 13 and to form another reinforcement for the quarter pillar 5. The quarter pillar reinforcement 17 extends downwardly and is formed with longitudinal extensions 17a and 17b and fixed to the inner panel 25 to reinforce the inner panel 25 as shown in FIG. 11. This structure is advantageous in that a force acting on the body structure can be highly dispersed so that an improved strength of the body structure can be obtained specifically around the suspension reinforcement.

Although the present invention has been described with reference to the specific embodiments, it is apparent from the disclosure to those skilled in the art that various changes, modifications can be made without departing from the spirits of the present invention. It is therefore to be understood that it is not intended to limit the invention to the specific embodiments.

We claim:

1. A rear body structure of an automotive vehicle comprising
   a vehicle body,
   a roof side rail disposed at an upper end of the vehicle body and extending longitudinally in the vehicle body,
   a belt line reinforcement located downward of and extending substantially parallel with said roof side rail,
   a center pillar structure extending in up and down directions and attached to the roof side rail at an upper end of the center pillar structure and to the belt line reinforcement intermediate of the upper end of the center pillar structure and a lower end of the center pillar structure,
   a rear pillar structure extending in the up and down directions, located rearward of the center pillar structure, and attached to the roof side rail at an upper end of the rear pillar structure and to the belt line reinforcement intermediate of the upper end of the rear pillar structure and a lower end of the rear pillar structure,
   a quarter pillar member extending in the up and down directions, located between the center pillar structure and the rear pillar structure, and attached to the roof side rail at an upper end of the quarter pillar member and to the belt line reinforcement intermediate of the upper end of the quarter pillar member and a lower end of the quarter pillar member,
   a quarter pillar reinforcement mounted on the quarter pillar member and attached to the roof side rail at an upper end of the quarter pillar reinforcement and to the belt line reinforcement at a lower end of the quarter pillar reinforcement,
   a wheel housing for covering a vehicle wheel,
   a suspension reinforcement extending in the up and down directions, disposed in an overlapped relationship with the quarter pillar member and the quarter pillar reinforcement, and integrally joined with the quarter pillar reinforcement and the quarter pillar member at an upper end portion of the suspension reinforcement and with the wheel housing at a lower end of the suspension reinforcement,
   a center pillar reinforcement mounted on the center pillar, said belt line reinforcement being attached to the center pillar reinforcement at a front end portion of the center pillar reinforcement, and
   a rear pillar reinforcement mounted on the rear pillar structure, said belt line reinforcement being attached to the rear pillar reinforcement at a rear end of the rear pillar reinforcement.

2. A rear body structure in accordance with claim 1, wherein the quarter pillar reinforcement is aligned with the suspension reinforcement with regard to the up and down direction.

3. A rear body structure in accordance with claim 1, further comprising inner panel means for forming an inner panel structure of the rear body structure, outer panel means for forming an outer side panel structure of the rear body structure, the inner panel means being connected with the outer panel means to form the center pillar structure, the quarter pillar member and the rear pillar structure.

4. A rear body structure in accordance with claim 3, wherein the inner panel means comprises a front inner panel and a rear inner panel, the front inner panel being connected with the rear inner panel at a position where the quarter pillar member is located.

5. A rear body structure in accordance with claim 4, wherein the front inner panel is connected with a front portion of the rear inner panel at a rear end of the front inner panel in an overlapped relationship with each other to form a single recess by incorporation together.

6. A rear body structure in accordance with claim 4, wherein said quarter pillar reinforcement is fixed to the inner panel means at said position.

7. A rear body structure in accordance with claim 6, comprising a seat belt anchor secured to said quarter pillar reinforcement.

8. A rear body structure in accordance with claim 4, wherein the rear inner panel is provided with an extension extending forwardly across the quarter pillar member.

9. A rear body structure in accordance with claim 3, wherein the suspension reinforcement is connected with the inner panel means to form a closed cross-sectioned structure.

10. A rear body structure in accordance with claim 1, wherein said suspension reinforcement extends upwardly across said belt line reinforcement and is terminated in said quarter pillar member.

11. A rear body structure in accordance with claim 1, wherein said suspension reinforcement is provided with and upper extension which extends upwardly beyond said belt line reinforcement and is terminated in aid quarter pillar member, the suspension reinforcement being connected with the belt line reinforcement, and the upper extension being connected with the quarter pillar member.

* * * * *